SELENIUM TRAPPING MEMORY

Filed Oct. 23, 1964 4 Sheets-Sheet 1

INVENTOR
JEROME L. HARTKE
BY Joseph J. Rosenthal
AGENT
Anthony D. Cennamo
ATTORNEY Oct. 22, 1968 J. L. HARTKE 3,407,394

SELENIUM TRAPPING MEMORY

Filed Oct. 23, 1964 4 Sheets-Sheet 2

INVENTOR
JEROME L. HARTKE
BY Joseph F. Rosenthal
AGENT
Anthony D. Cennamo
ATTORNEY INVENTOR
JEROME L. HARTKE
BY Joseph F. Rosenthal
AGENT
Anthony D. Cennamo
ATTORNEY Oct. 22, 1968 J. L. HARTKE 3,407,394

SELENIUM TRAPPING MEMORY

Filed Oct. 23, 1964 4 Sheets-Sheet 4

INVENTOR
JEROME L. HARTKE
BY Joseph J. Rosenthal
AGENT
Anthony D. Cennamo
ATTORNEY United States Patent Office 3,407,394
Patented Oct. 22, 1968

3,407,394
SELENIUM TRAPPING MEMORY
Jerome L. Hartke, Webster, N.Y., assignor to Xerox Corporation, Rochester, N.Y., a corporation of New York
Filed Oct. 23, 1964, Ser. No. 406,047
9 Claims. (Cl. 340—173)

ABSTRACT OF THE DISCLOSURE

A method and apparatus for the electrical storage and retrieval of information which utilizes the trapping of electrical charges within the bulk of the homogeneous photoconductive insulating material due to differential hole-electron mobility to form a space charge within that bulk is disclosed. The neutralization of this charge trapped within the bulk of the photoconductive insulating material may be utilized to produce an electrical signal indicative of the information stored. A layered structure comprising in sequence a conductive layer, a blocking layer, a light absorbing homogeneous photoconductive insulating layer which is adapted to trap at least one polarity of charge carrier, another electrical blocking layer, and an electrically conducting layer is utilized as a structure to carry out the desired functions. In general, at least one of the electrically conductive layers will be transparent to allow optical switching of the photoconductive layer.

This invention relates to a novel method and apparatus for electrical storage of information, particularly digital information.

Electrical data storage devices or memory devices, are a necessary adjunct of electrical data processing equipment, high speed computer output devices and the like. Information is fed into such storage devices in the form of electrical signals, usually electrical pulses, and the information can be returned, on request, in the form of similar electrical signals. Desirable attributes of such storage devices include a large capacity, rapid access time, small size, low cost, high reliability, erasability, and the like. Existing devices make use of permanent magnetic elements in the form of tapes, discs, cylinders, or cores, recirculating acoustical delay lines, electrical charges stored on the surfaces of insulators, electronic circuits, as well as a number of other principles and materials.

This invention employs an entirely different principle: the trapping of electrical charge carriers within the body of a photoconductive or semiconductive layer. It is accordingly a broad objective of the invention to provide a novel means and method for storing information through the use of electrical charge trapped within a body of semiconductive material. Subsidiary objectives will become apparent on reading this specification.

Figure 1:
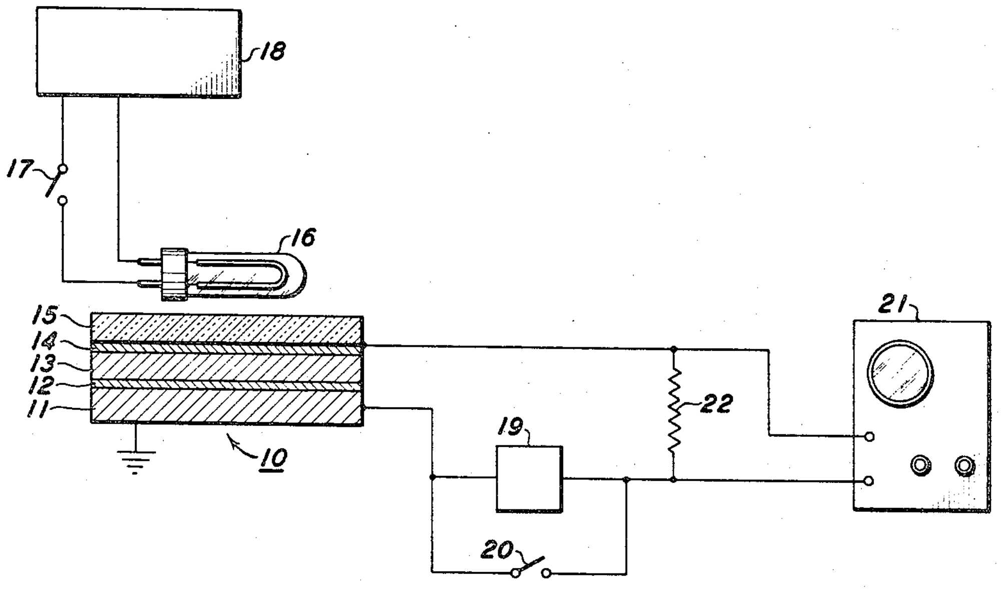
FIG. 1 is a schematic view of an elementary embodiment of the invention.

FIGURE 1 is a schematic representation of a simplified form of apparatus according to the invention. The apparatus includes, as its principal component, a storage element 10. This element comprises an electrically conductive substrate or support 11, a very thin insulating layer 12 coated thereover, a layer of homogeneous photoconductive material 13 coated over layer 12, another very thin layer of insulating material 14 coated over layer 13, and finally a thin transparent electrically conductive layer 15 coated over layer 14. As will be shown later, layers 12 and 14 can be eliminated in some instances. Also, conductive layer 15 may comprise a transparent conductive layer on a transparent insulating support and layer 11 may comprise merely a thin transparent layer, the only requirement being that the storage element 10 have adequate strength.

A gas discharge flash lamp 16 is positioned in an illuminating relationship with layer 15 and is connected through a momentary contact switch 17 to a high voltage power supply 18 capable of delivering from several hundred to several thousand volts. A DC power supply 19 is connected between layer 11 and a cathode ray oscilloscope 21. A switch 20 is connected so as to short out power supply 19 when closed. Layer 15 is connected to the other terminal of oscilloscope 21 and a load resistor 22 is connected in parallel with the input connections to the oscilloscope. In the drawing, layer 11 is shown as being grounded. This is largely a matter of convenience since the ground connection is optional and may be applied to either layer 11 or layer 15. Similarly power supply 19 and switch 20 may be installed either between oscilloscope 21 and layer 11, as shown, or between oscilloscope 21 and layer 15. In the first case, the oscilloscope must have a floating input, but in the second case, it may have a grounded input.

Figure 2:
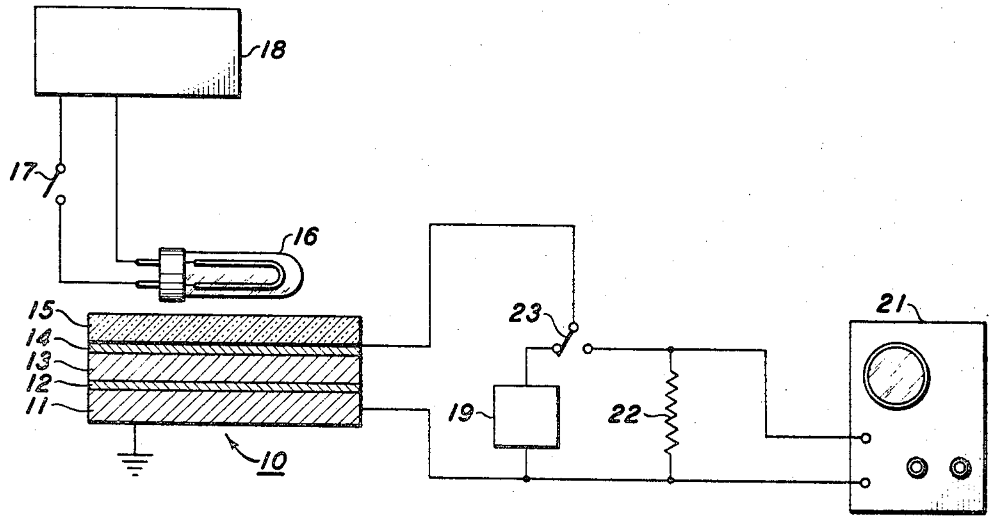
FIG. 2 is a simplified version of FIG. 1.

To record information with this apparatus switch 20 is opened so as to apply the voltage from power supply 19 between layers 11 and 15, and flash lamp 16 is operated by momentarily closing switch 17. Switch 20 is then closed and the information is now stored in storage element 10. If power supply 19 does not have sufficient internal impedance to prevent its burning out when switch 20 is closed, a separate internal switch may be installed in the power supply and arranged to open when switch 20 closes, or a current limiting circuit may be installed in the power supply. To read the stored information out at a later time, switch 17 is again closed in order to flash lamp 16 and a short voltage pulse simultaneously appears across load resistor 22 and can be observed on oscilloscope 21. This output pulse will be observed if, and only if, an information pulse was previously read in by the procedure described above. Read out in this system is largely destructive and successive subsequent operations of flash lamp 16 will at most, produce very small and sucessively diminishing pulses across oscilloscope 21.

Where there is no need to observe the recording step on the oscilloscope, the simplified form of apparatus shown in FIG. 2 may be used. Switch 23 is connected to power supply 18 for recording only, and to oscilloscope 21 at other times. Recording and read out take place as in FIG. 1, but only read out pulses are observed on the oscilloscope.

The operating principles of the invention can be more clearly understood in connection with a consideration of FIG. 3. FIG. 3*a* is a simplified representation of the apparatus of FIG. 1 just prior to the recording of an electrical signal. Power supply 19 is represented by its functional equivalent, a battery 30. Other elements of FIG. 1 have been eliminated for simplicity. Electrical charges are distributed along conductive layers 11 and 15, but are prevented from entering the body of photoconductive layer 13 by insulating layers 12 and 14. Layer 11 is shown as positive and layer 15 as negative, but this is for illustrative purposes only. FIG. 3*b* illustrates what is believed to happen when flash lamp 16 is energized. The light from lamp 16 passes through the transparent conductive layer 15 and the insulating layer 12 and is absorbed near the upper surface of photoconductive layer 13. In being absorbed, the light gives rise to a large number of electron-hole pairs near the surface of photoconductive layer 13 which is nearest flash lamp 16. The positively charged holes play no role at this point because they are formed in close proximity to layer 15 and, because of their positive polarity, they can only move towards that layer. Since the holes can at most move a very short distance they have no effect on the external circuit. The electrons, on the other hand, are attracted through photoconductive layer 13 towards the positive layer 11. However, photoconductive material 13 is chosen to have a very short electron trapping range, so that most of the electrons are not able to completely traverse photoconductive layer 13 but are trapped within the body of that layer as shown in the figure. This charge migration and trapping process continues only during the brief instant that flash lamp 16 is illuminated. After the flash from lamp 16 is over, external voltage is preferably removed, as by closing switch 20 in FIG. 1. This leads to the situation shown in FIG. 3*c*. Here the negative charges remain trapped in the photoconductor and the only charges on electrodes 11 and 15 are those induced by the trapped charges. These trapped charges constitute the stored or remembered signal and will remain in position for a usually long period of time on the order of 10 minutes or longer. Thus, the trapped charges are in the bulk of layer 13 and are not stored on an insulating interface.

Figure 3A:
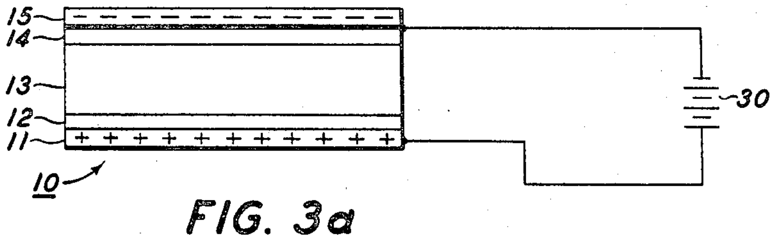
FIG. 3 is a series of enlarged schematic sectional views of the recording member of FIG. 1.
Figure 3B:
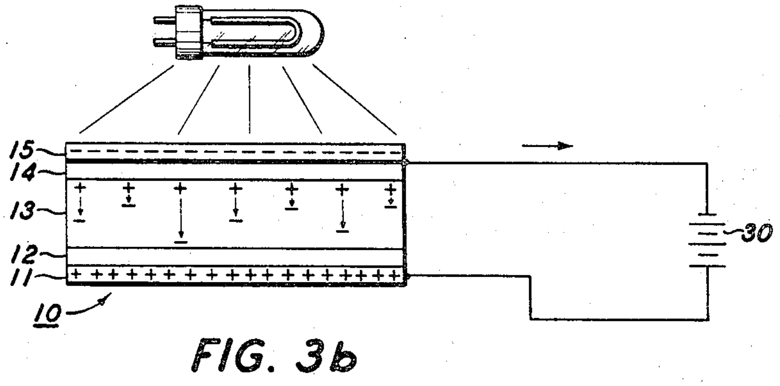
Figure 3C:
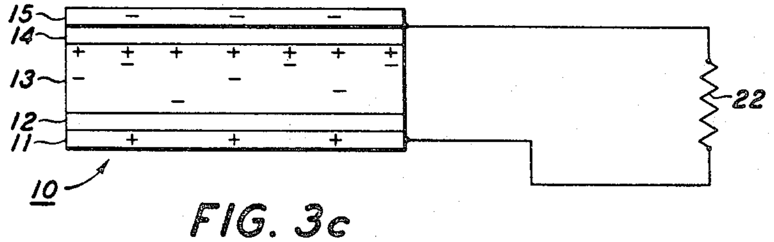
Figure 3D:
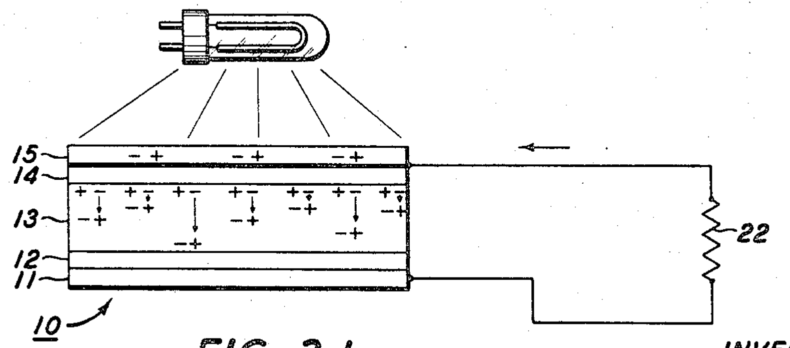

FIG. 3*d* represents the situation when flash lamp 16 is later operated. Once again electron-hole pairs are formed at the surface of photoconductive layer 13. This time, however, the negative electrons remain at the surface, neutralizing the positive charge which previously existed at the surface, and the positive holes are attracted into the body of layer 13 and towards the trapped electrons. This represents a net movement of positive charge from layer 15 into layer 13. This gives rise to a corresponding flow of positive or negative current in the external circuit, as shown by the arrows. This current flow produces a voltage drop across load resistor 22 which can be detected, for example, by the oscilloscope 21 in FIG. 1. Holes should preferably have a long range in photoconductive layer 13 in order that all the holes entering the layer will reach and neutralize trapped electrons without themselves becoming trapped. If a photoconductor is employed which has a short range for holes and a long range for electrons, then the polarity of battery 30 should be reversed from that shown in FIGS. 3*a* and 3*b* and the polarity of the output pulse will also be reversed from that shown in FIG. 3*d*.

Storage element 10 may take a variety of forms and employ a variety of materials in accordance with the teachings of the invention. At least one of layers 11 and 15 should preferably be thick enough to impart some mechanical strength to storage element 10. It is, however, possible to make element 10 quite thin and flexible and to stretch it in a frame or the like. As noted previously, layer 15 should be transparent to light. Layers 12 and 14 should be very thin compared to layer 13 so that substantially all of the voltage from power supply 19 or battery 30 appears across layer 13 and not layers 12 and 14. These layers 12 and 14 should be sufficiently insulated to prevent the injection of electrical charge from layers 11 and 15 into layer 13. In many cases, layers 12 and 14 may be omitted as actual structures, their role being taken over by a blocking type junction between the photoconductive layer 13 and the conductive layers 11 or 15. For illustrative purposes only, layers 12 and 14 may comprise a vacuum evaporated layer of zinc sulfide from about 1000 to about 2000 angstroms or a thin solvent coated layer of polyvinyl chloride or other plastic. Transparent conductive layer 15 may comprise any conventional layer of this type such as very thin evaporated or sputtered gold or other metallic layers or a layer of evaporated, sputtered, or chemically deposited copper which has been converted to copper chloride by exposure to iodine vapors. Conductive support layer 11 may comprise a metal plate over which is coated an insulating layer 12 of the type described in connection with layer 14. Preferred materials include an oxidized sheet of aluminum or a sheet of glass covered with a transparent electrically conductive coating of tin oxide. These materials normally form blocking contacts with an applied photoconductor and, therefore, layer 12 can generally be omitted when these substrates are employed.

The photoconductive layer 13 should have a very high dark resistivity, high light absorption, as well as suitable trapping properties. The high dark resistivity is required in order that the trapped charges shown in FIG. 2*c* will not be charge neutralized too rapidly by free charge carriers in the bulk of layer 13. For storage capability of about 10 minutes the dark resistivity of layer 13 should be at least on the order of $10^{-15}$ ohm-cm. High light absorption is a necessary property in order that electron hole pairs can be generated exclusively at the surface of the layer as shown in FIGS. 2*b* and 2*c*. Since information is stored in accordance with this invention by trapped charges, the trapping properties or charge carrier ranges, of the photoconductor are very important. The range for one sign of electrical charge carrier should preferably be considerably greater than the range for the other sign of carrier. This contributes to improved erasability and signal to noise ratio. The shorter carrier range should be such that for reasonable voltages and reasonable thicknesses of layer 13, a large fraction of the carriers will be trapped in layer 13 rather than passing through and also so that on the average, a charge travels as far as possible through layer 13 before being trapped. In terms of the band theory of semiconductors, donor or acceptor levels should be present near either the conduction or valence bands, respectively, but these levels should be far enough from the conduction or valence bands, respectively, so that charges trapped therein have an adequate lifetime in view of the required storage time.

These requirements are well met by thin layers of vacuum evaporated amorphous selenium. Highly purified selenium has extremely high dark resistivity and high light absorption through about 6000 angstroms. The electron and hole ranges in evaporated amorphous layers of purified selenium are each about $10^{-7}$ cm.$^2$/volt. This range is feasible for carrying out the present invention, but higher than desired. Further, the substantial equality of electron and hole ranges does not lead to optimum performance. However, by using a flash evaporation technique to homogenously incorporate chlorine in the parts per million range in the evaporated selenium, the properties can be radically improved. As little as two parts per million of chlorine will lower the electron range to $10^{-8}$ cm.$^2$/v. without appreciably effecting the hole range. Twenty parts per million of chlorine will further lower the electron range to a value estimated to be close to $10^{-9}$ while the hole range remains at $10^{-7}$. chlorine concentration can be increased to at least about 50 parts per million. A trapped carrier range of $10^{-8}$ to $10^{-9}$ is very satisfactory for the purposes of the present invention. Layer 13 should be at least thick enough to minimize the possibility of pinholes. This sets a practical lower limit of about 1 micron. As the thickness of layer 13 increases so do the voltage requirements for optimum operation. A desire to keep the operating voltage below about 200 volts dictates a practical, but not absolute, upper limit of about 20 microns when using amorphous selenium layers. A preferred layer would typically be about 10 microns thick with an electron range between $10^{-8}$ and $10^{-9}$, and with an operating voltage of about 100 volts.

Thus, a chlorine doped selenium storage element was constructed in accordance with the above description and tested in a circuit similar to that in FIG. 1. A 20 micron thick layer of chlorine doped amorphous selenium was vacuum evaporated onto an oxidized aluminum substrate which was maintained at a temperature of about 50° C. A thin zinc sulfide layer was evaporated over the selenium and the final transparent layer was a semi-transparent vacuum evaporated gold layer. The flash lamp 16 was a General Radio type 1531–A Strobotac and the load resistor 22 was 100 ohms. The recording was initially accomplished by applying 180 volts negative from power supply 18 to the transparent electrode 15 while the Strobotac was operated. This produced a 4 pulse on the oscilloscope. When the power supply was disabled and the storage element interrogated by again operating the Strobotac a six volt pulse of opposite polarity appeared on the oscilloscope. The pulse duration was about 1 microsecond, which corresponds to the duration of the light flash from the Strobotac. The intrinsic pulse width of the storage element is one or two orders of magnitude smaller than one microsecond, however. The flash lamp was energized three more time, all flashes being spaced five seconds apart. The second flash produced a pulse of 0.5 volt, the third flash produced 0.2 volt, and the fourth flash also produced 0.2 volt. The above measurements showed that the storage element was capable of storing an information input, that the readout is destructive, and that there is a very high signal-to-noise ratio between the first, or true, readout pulse and subsequent readout pulses after the stored information has been erased or even the pulse corresponding to the readin operation. A similar series of experiments were also run using 90 volts input voltage instead of 180. In this case, the readin signal was one volt, the readout signal was two volts of opposite polarity, and the subsequent false readout signals were 0.2 volt, 0.15 volt, and 0.1 volt, respectively. When operated in the above manner, the storage element would retain stored information for approximately 10 minutes.

The same storage element was also tested as above, except that positive voltages were applied from the power supply 18. When 180 volts were applied, the readin signal was approximately 100 volts and no readout signal could be observed when the 90 volts was applied, the readin signal was 60 volts and, again, no readout signal was observed. The high readin signal, which corresponds to a large current pulse, and the absence of a readout signal clearly showed that the storage element has a long range or high conductivity for holes and does not trap an appreciable number of holes under suitable operating conditions. The results obtained with a negative voltage applied to the transparent conductive layer 15 show that the storage element is in fact very effective in trapping electrons.

The tests of the preceding paragraph were repeated using a similar storage element which was, however, prepared from highly purified and chlorine-free selenium. When a positive voltage of 180 volts was applied to the transparent electrode for readin, the readin signal was in excess of 100 volts and the readout signal was considerably less than 1 volt. When the polarity was changed and 180 volts negative was applied to the transparent electrode, readin signal was about 100 volts and the readout signal about 1 volt. The voltage was then lowered to 24 volts and the experiments repeated. When 24 volts positive was applied to the transparent electrode for readin, the readin signal was 6 volts and the readout signal less than 0.2 volt. When 24 volts negative was applied to the transparent electrode, the readin signal was five volts and the readout signal 0.3 volt. These experiments show that pure selenium may also be used as the storage element although not with equally effective results. Much lower voltages must be used for readin to avoid excessive readin currents and much smaller readout voltages are obtained. It is also apparent that the electron and hole ranges are comparable in this material, although the electron range is still somewhat smaller than the hole range.

A practical memory or storage device must be capable of storing not one but thousands or millions of bits of information. This is readily accomplished with the present invention by using a large area storage element and selectively illuminating small portions of it for reading in or reading out information. A single storage element can thus store tens of thousands of bits of information even though it has only two electrical connections. Selective illumination of the storage element can be readily accomplished by focusing the screen of a cathode ray tube on the storage element, although other selective pin point illuminating means such as cross-grid electroluminescent devices or mechanical devices may be employed. The cathode ray tube, in particular, leads to a far simpler addressing system than is required for magnetic core memories or the like.

Figure 4:
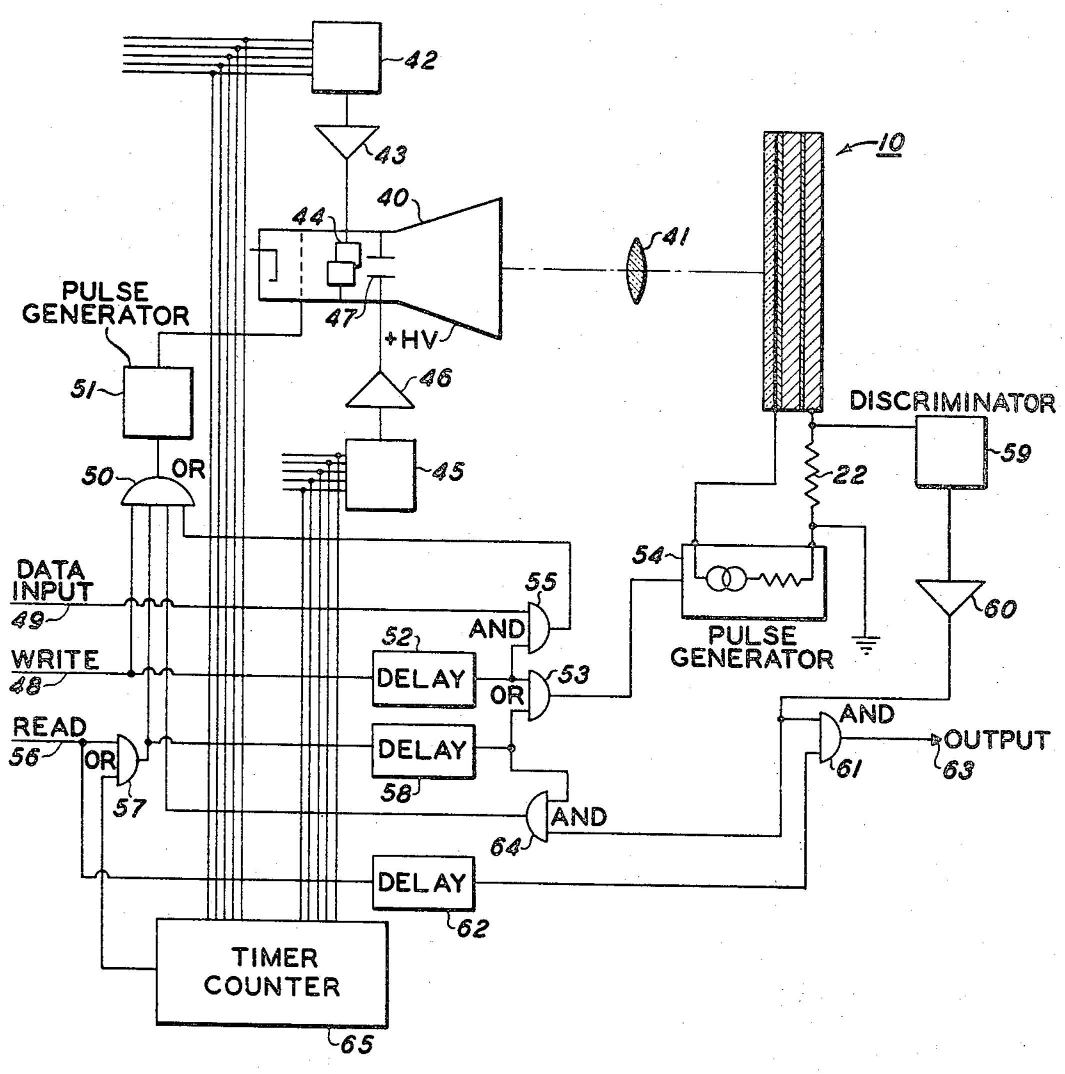
FIG. 4 is a schematic representation of one form of memory system in accordance with the present invention.

Referring to FIGURE 4, storage element 10 is the same as in FIGURES 1, 2 and 3 except that it may be larger in area. A cathode ray tube 40 is focused onto storage element 10 by a lens 41. Stored information is addressed by an X–Y coordinate system and the X coordinate of an information bit to be readin or readout is first directed to a digital to analog converter 42 which feeds the horizontal deflection plates (or coils) 44 through an amplifier 43. A digital analog converter 45 and amplifier 46 perform the same function for the vertical deflection plates (or coils) 47. Thus, an information address supplied to the memory system from an external apparatus such as a computer or a recorder, is converted into a discrete spot of light on the cathode ray tube and thus into a discrete spot of light on the storage element 10. Normally, each information bit will occupy an area on the storage element between 1 millimeter square and 1/10 millimeter square. The cathode ray tube is normally biased off, however, and only produces a light output when an unblanking signal is applied. Readin is accomplished by providing the appropriate address information to the digital to analog converters 42 and 45 and by simultaneously supplying a short voltage pulse to the read line 48 and a voltage input level indicative of a binary "1" or "0" to data input line 49.

The write line 48 is connected to an or circuit 50 and to a pulse generator 51 which provides an unblanking pulse of approximately 1 microsecond duration to the cathode ray tube 40. Thus, a pulse on write line 48 causes a light spot to appear at a pre-selected area of storage element 10, causing erasure of any information previously stored on that area. A light intensity of about $10^{12}$ photons per square centimeter is desirable at storage element 10 for erasure, readin, and readout purposes. No output signal is produced under these conditions for reasons which will be apparent later. Write line 48 is also connected to a delay circuit 52, the delayed output of which is connected through an or circuit 53 to a pulse generator 54 which provides a low impedance pulse of about 1 microsecond delay and 100 volts amplitude to the storage element 10 through a load resistor 22. At the same time, the delayed output of delay circuit 52 is applied to one input of and circuit 55, the output of which is connected to or circuit 50. Data input line 49 is the other input to and circuit 55. Therefore, the presence of a 1 on data input line 49 will cause a light spot to appear at the pre-selected area of storage element 10 at the same time that a voltage pulse is applied, thus causing recordation of a binary 1. A 0 input on line 49 does not cause a light pulse to be produced by cathode ray tube 40.

Readout is accomplished by applying a short voltage pulse to read line 56 which is connected through or circuit 57 to or circuit 50 and delay circuit 58. A pulse applied to read line 56 thus causes a light pulse from cathode ray tube 40 to fall on the pre-selected area of storage element 10 and causes an electrical signal to appear across load resistor 22. The voltage appearing across load resistor 22 is fed to a discriminator 59 which produces an output signal only if the voltage at its input exceeds a level which serves to distinguish between a 1 and a 0 output. The discriminator signal is amplified by amplifier 60 and applied to one input of and circuit 61. The other input of and circuit 61 is supplied through the delay circuit 62 by read line 56. Thus, the presence of a signal corresponding to a 1 on load resistor 22 causes an output pulse to appear on output line 63 only when a read pulse is applied to input 56. Delay circuit 62 is provided to compensate for any transmission delays in the electronic circuitry between the inut and the output. In most cases, it will not actually be required.

Where a destructive type of memory system is desired, the above-described elements are all that are required to complete the system. If, however, a permanent type of memory system is required, then means must be provided to regenerate the information as it is read out. The necessary elements are also included in FIGURE 4. The output pulse (if any) from amplifier 60 is fed to one input of and circuit 63, the output of which is connected to or circuit 50. The other input of and circuit 63 is connected to the output of delay circuit 58. This causes a second light pulse to be produced by cathode ray 40 at a time later than the original pulse on input 56, while there is still an output from amplifier 60. The output of delay circuit 58 is also fed through or circuit 53 to pulse generator 54 which applies a second voltage pulse to storage element 10. Thus, the information which is erased by the application of a pulse to the read line 56 is automatically re-recorded on the same spot.

The above type of regeneration is all that is required for a short term memory such as a digital printer buffer storage, format converter or the like. If, however, a long term storage is required, then it is necessary to regenerate the entire contents of storage element 10 at periodic intervals. This can be accomplished by means schematically shown as timer counter 65. This element is connected through or circuit 57 to read line 56 and also to the digital to analog converters 42 and 45. At intervals on the order of 10 minutes this device generates a sequence of address signals corresponding to all address positions on the storage element and simultaneously pulses read line 56 for each address position. In effect, timer counter 65 periodically interrogates each individual address location on storage element 10. Since the readout operation automatically regenerates information (if any) stored at a given location, timer counter 65 thus periodically regenerates the entire contents of storage element 10.

Figure 5:
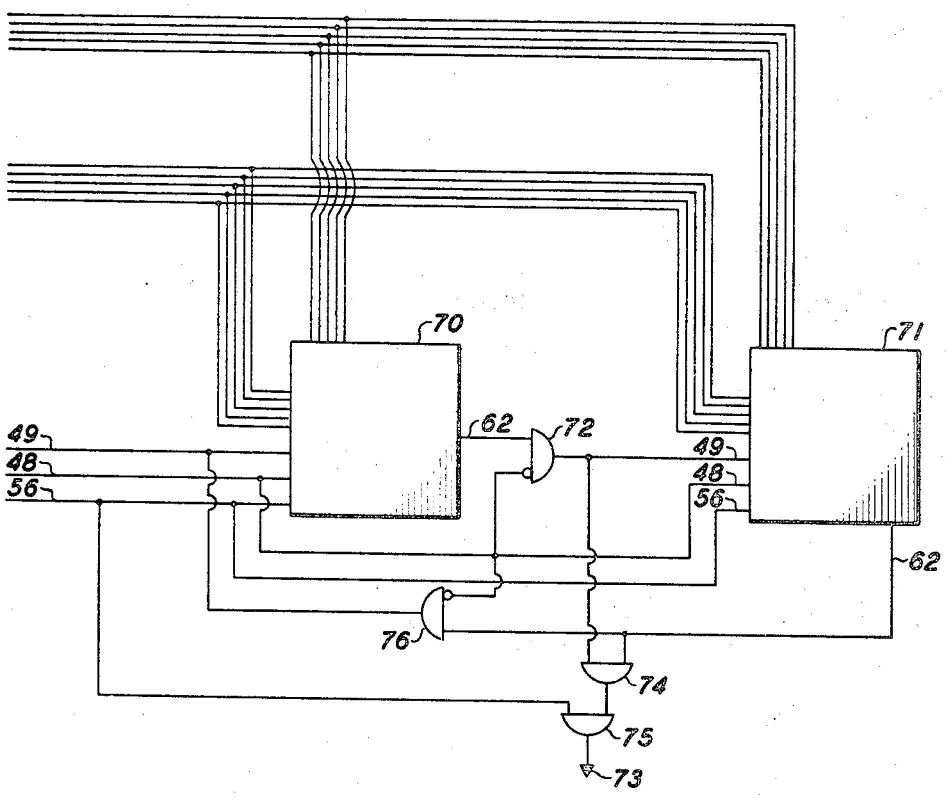
FIG. 5 is a schematic representation of a different form of memory system in accordance with the present invention.

FIGURE 5 represents in schematic form a different arrangement for realizing non-destructive readout in accordance with the invention. Reference characters 70 and 71 designate two identical storage devices which are identical with those of FIGURE 4 except that they lack delay circuit 58 and the associated elements of FIGURE 4 which provide regeneration in that figure. The address, read, and write inputs of both devices are connected in parallel. Information is read into storage device 70 only, however. If a read signal is thereafter applied to storage device 70, an output signal will appear at output terminal 62 and will also appear at the system output terminal 73 of and circuits 74 and 75. At the same time, the output signal from storage device 70 is applied to the input of storage device 71 and the information now appears in storage device 71. Further interrogation of the system will cause an output pulse to appear at the terminal of device 71 which will produce an output at the system output 73 and will cause the information to be read back into device 70. Each time a read signal is applied in conjunction with the appropriate addressing signals an output signal will appear at the system output 73 and the stored information will be cycled back and forth between devices 70 and 71.

And circuit 72 prevents the output of storage device 70 from being transferred to storage device 71. Accordingly, when data is read into a location of device 70, the corresponding location of device 71 is erased. Another and circuit 76 prevents the output of storage device 71 from being fed back to the input of device 70 during a write cycle. And circuit 75 prevents a signal from appearing at output 73 except when called for by a read signal. The system of FIGURE 5 can also simplified by using a single cathode ray tube in connection with a beam splitting arrangement to illuminate two separate storage elements.

A group of storage systems such as those shown in FIGURE 4 may also be addressed in parallel to form a word oriented storage system. If there are N binary bits in the memory words, then N storage elements 10 will be employed. Each such element may be provided with its own cathode ray tube as in FIGURE 4 or several storage elements may share the same tube by means of beam splitting arrangements. Each storage element will have its own electronics of the type shown in FIGURE 4. In this variation of the invention, the X–Y address signals constitute a word address and serve to address all storage elements simultaneously. Readin or readout of individual bits within the word is then accomplished by pulsing the individual write lines or read lines associated with the individual storage elements.

It is also possible to move the storage element with respect to a spot of light instead of, or in addition to, moving a spot of light with respect to the storage element. Thus, the storage element may be fabricated in the form of a rotating drum or disc to provide memory systems with extremely large storage capacities in a manner generally comparable to that employed with magnetic drum and disc memories.

Means have not been specifically shown for erasing information from regenerative type of memories but it will be appreciated that this can readily be accomplished by temporarily disconnecting the regeneration circuit, thus converting the memory to the destructive variety, or by writing 0 in the areas where erasure is desired.

The illustrated electronic systems are described by way of example only since other forms of system organization are possible and will be apparent to anyone skilled, for example, in the digital data processing art. Other forms of energy may be substituted for visible light including, for example, electron beams. Individual circuit elements have been shown in block form only since conventional and commercially available logic circuits, amplifiers, gates, discriminators, and the like may be employed. A memory system constructed in accordance with the invention does not require any unusual voltages or frequencies.

While the invention has been described in terms of the presence of trapped charges corresponding to an information bit, the invention can equally well be operated in the reverse manner wherein an information bit is represented by the absence of stored charge in the storage element. When operated in this mode, charge may first be stored at all points of the storage element and is then selectively removed to form the stored information pattern.

While the invention has been described in terms of specific embodiments, it will be appreciated that this was for illustrative purposes only and there is no intention to limit the scope of the invention except by that of the claims.

What is claimed is:

1. A unitary electrical signal storage element comprising in sequence an electrically conductive layer, an electrical blocking layer, a light absorbing homogeneous photoconductive insulating layer adapted to trap at least one polarity of charge carrier, an electrical blocking layer, an electrically conductive layer, at least one of said electrically conductive layers being transparent, said photoconductive layers being substantially thicker than said blocking layers.

2. The element of claim 1 in which the photoconductive insulating layer comprises a material having substantially shorter range for one polarity of charge carrier than for the other.

3. The element of claim 1 in which the photoconductive insulating layer comprises vitreous selenium.

4. The element of claim 1 in which the photoconductive insulating layer comprises vitreous selenium containing from about 2 to about 50 parts per million of chlorine.

5. Electrical signal storage apparatus comprising in combination a unitary electrical signal storage element comprising in sequence an electrically conductive layer, an electrical blocking layer, a light absorbing homogeneous photoconductive insulating layer adapted to trap at least one polarity of charge carrier, an electrical blocking layer, and an electrically conductive layer, at least one of said electrically conductive layers being transparent, said photoconductive layer being substantially thicker than said blocking layers, controllable means to establish an electrical field between said conductive layers, means to illuminate said transparent conductive layer simultaneously with said electrical field, and means to illuminate said transparent conductive layer in the absence of said field to produce an electrical output signal.

6. Electrical signal storage apparatus comprising in combination a unitary electrical signal storage element comprising in sequence an electrically conductive layer, an electrical blocking layer, a light absorbing homogeneous photoconductive insulating layer adapted to trap at least one polarity of charge carrier, an electrical blocking layer, and an electrically conductive layer, at least one of said electrical conductive layers being transparent, said photoconductive layer being substantially thicker than said blocking layers, addressing means to selectively illuminate a pre-selected address area of said storage element, controllable field means to establish a field between said conductive layers, write means to simultaneously energize said addressing means and said field means, read means to energize said addressing means without said field mean and to derive an output signal from said storage element if and only if the write means has previously recorded on the same address area.

7. The method of storing and retrieving a signal comprising trapping electrical charges within the bulk of a homogeneous photoconductive insulating material to form a space charge therein, and thereafter neutralizing said space charge to create an electrical signal in an electrical circuit connected to said photoconductive insulator.

8. Storage apparatus according to claim 6 further including means to rewrite stored signals immediately after destructive readout thereof.

9. Storage apparatus according to claim 6 further including means to periodically regenerate the signals stored therein.

References Cited

UNITED STATES PATENTS

| | | | |
|---|---|---|---|
| 3,148,354 | 9/1964 | Schaffert | 340—173 |
| 3,205,484 | 9/1965 | Schwertz | 340—173 |
| 3,229,261 | 1/1966 | Fatuzzo | 340—173 |

TERRELL W. FEARS, *Primary Examiner.*